United States Patent Office 2,937,171
Patented May 17, 1960

2,937,171
PROCESS FOR OBTAINING FLUORINATED ORGANIC COMPOUNDS

William Channing Smith, Wilmington, Del., assignor to E. I. du Pont de Nemours and Company, Wilmington, Del., a corporation of Delaware No Drawing. Application June 13, 1958
Serial No. 741,717
20 Claims. (Cl. 260—248)

This invention relates to a new method for preparing fluorine-containing organic compounds.

Compounds which contain fluorine have achieved technical importance because they possess an unusual combination of properties such as excellent thermal stability and high resistance to oxidative degradation. They are used as refrigerants, as propellants in aerosols and as lubricants for high temperature applications. They may show physiological activity and are useful in biological fields. It is important, therefore, that simple and economical methods be developed for obtaining fluorinated compounds.

Present processes for obtaining fluorine-containing compounds generally employ elemental fluorine or hydrogen fluoride alone or in combination with selected metal fluorides. The processes require care in operation because of the corrosive nature of the reactants and often yield substantial quantities of undesirable by-products.

A novel process has now been found for preparing fluorinated organic compounds. It comprises reacting with sulfur tetrafluoride an organic compound free of Zerewitinoff active hydrogen and containing bonded to a carbon atom, at least one halogen, selected from chlorine and bromine, any acyclic multiple bonds present being between carbon atoms. That is, if there are present in the compound any multiple bonds which are not part of a cyclic structure, such acyclic multiple bonds must be between carbon atoms. Thus in accordance with the process of the invention fluorine replaces at least one chlorine or bromine atom which is bonded to a carbon atom in the initial reactant. The fluorine-bearing reaction product contains at least one more fluorine atom than is present in the initial reactant.

A wide range of chlorine or bromine-bearing organic compounds, as defined above, can be employed in the process. The compounds can be aliphatic (n-propyl bromide, β,β'-dichlorodiethyl ether), cycloaliphatic (cyclopentyl chloride), aromatic (bromonaphthalenes), and heterocyclic (3-chlorothiophene) in character. Compounds with a wide range of molecular weights can be employed. The reactants can be single carbon compounds, for example, chloromethanes, or may be composed of many carbon atoms, for example, chlorinated paraffins or chlorinated kerosene. The reactants need not be pure compounds but can be mixtures, for example, mixed chlorinated xylenes or chlorinated diphenyls can be employed.

The chlorinated and/or brominated organic reactants which are employed in the process are free of acyclic groups which contain multiple-bonded oxygen, nitrogen, sulfur and elements other than carbon. The presence of such multiple bonds in acyclic groups of the reactant would require the use of excess quantities of sulfur tetrafluoride and result in a complex mixture of fluorinated products since groups of the types named can react with sulfur tetrafluoride.

A broad class of reactants which operate well in the process of the invention are organic compounds, free of Zerewitinoff active hydrogen and containing at least one halogen of the group of chlorine and bromine, bonded to a carbon atom which is bonded only to elements selected from hydrogen, halogens of atomic number 9–35, inclusive, carbon and nitrogen, said nitrogen being a multiple-bonded member of a heterocyclic ring, any acyclic multiple bonds, if present in said organic compounds, being between carbon atoms. Halogenated hydrocarbons and halogenated cyclic azines are illustrative of this broad class of operable compounds and are discussed more fully in the following paragraphs.

Halogenated hydrocarbons which contain at least one chlorine or one bromine atom form one preferred group of reactants for use in the process of the invention. The term, halogenated hydrocarbon, as used herein, is intended to include partially and completely halogenated hydrocarbons, that is, hydrocarbons in which one, several or all of hydrogens bonded to carbon have been replaced by halogens of atomic number 9–35, inclusive, of which at least one of the halogens is of atomic number 17–35, inclusive. The halogenated hydrocarbons can be saturated or unsaturated and aliphatic, cycloaliphatic or aromatic in character. Examples of operable halogenated hydrocarbons are n-bromoheptane, crotyl chloride, 3-bromo-4-fluorocyclohexene and 1,3-dichlorobenzene.

When polyhalogenated hydrocarbons of long chain length are employed in the reaction, the fluorine-containing products which are obtained are usually mixtures. If it is desired to obtain primarily pure products in good yield, polyhalogenated hydrocarbons, which contain at most 7 carbons are employed.

An especially preferred group of reactants are fully halogenated hydrocarbons (perhalocarbons) of at most 6 carbons which contain at least one halogen of atomic number 17–35, inclusive, the remaining halogens having atomic numbers of 9–35, inclusive. Many of these compounds are commercially available and react well in the process to give good yields of desirable products. The perhalomethanes which contain chlorine or bromine, for example, carbon tetrachloride and carbon tetrabromide, are especially desirable reactants for the process of the invention.

A second preferred group of compounds which are particularly useful in the process of the invention are chlorine and bromine-bearing heterocyclic compounds which are described broadly as cyclic azines, that is, compounds which contain at least one nuclear nitrogen doubly bonded to a nuclear carbon. This class of compounds includes cyclic mono-, di- and triazines. The compounds, 2-chloroquinoline and 1-bromoisoquinoline, are illustrative of operable cyclic monoazines in the process. Chlorinated and brominated pyrimidines are examples of cyclic diazines. Cyanuric chlorides and bromides are representative of cyclic triazines.

The pyrimidines are characterized by the following structure:

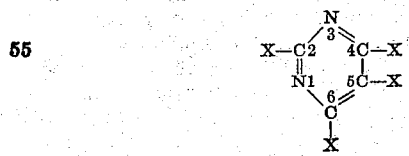

wherein at least one of the X groups bonded to the carbons in the 2, 4, and 6-positions is chlorine or bromine, the remaining X groups being preferably hydrogen, halogen, hydrocarbon, or hydrocarboxyloxy.

The cyanuric halides are characterized by the following structure:

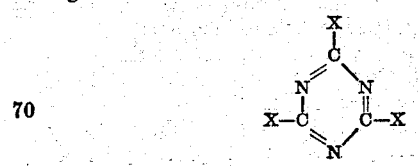

where at least one of the X groups is a halogen of atomic number 17–35, the remaining X groups being halogens.

The chlorine or bromine-bearing reactants which are employed in the process can be of commercial grade. The fluorinating agent, sulfur tetrafluoride, can be obtained by processes described in the literature (Brown and Robinson, J. Chem. Soc. 1955, 3147–51).

The mechanism of the reaction is not exactly known. In the operation of the process at least one chlorine or bromine atom is displaced with fluorine derived from the sulfur tetrafluoride. The displaced halogen appears in the by-products of the reaction as free halogen or as a sulfur halide, for example, sulfur monochloride or sulfur dichloride. Additional fluorine atoms can be and sometimes are introduced into the halogenated compound during the process through side reactions. The characteristic feature, however, of the invention is the replacement or substitution of at least one chlorine or bromine with fluorine in a halogenated compound.

In the operation of the process of the invention a rearrangement of the halogenated reactant can sometimes occur. Thus, organic compounds which contain chlorine or bromine bonded to a primary carbon can yield mixtures of products in which the fluorine is bonded to a primary or a secondary carbon. In a few cases the halogen-bearing reactant may disproportionate under the conditions of the reaction and form fluorine-bearing products with lower carbon contents than the initial reactant. In all cases, however, there is obtained a product which contains at least one more fluorine atom than is present in the initial reactant.

The sulfur halides used and formed in the reaction are generally toxic and quite reactive; hence suitable precautions should be observed in handling these compounds.

The reaction is conducted under substantially anhydrous conditions, preferably in the absence of oxygen, in ether a batch or continuous flow process. The reaction chamber is preferably made of material resistant to chemical attack by hydrogen fluoride and halogens, for example, stainless steel. In a batch process, a vessel capable of withstanding pressure is preferably flushed with an inert gas, for example, nitrogen, to displace the air and is then charged with the chlorine or bromine-bearing reactant. The pressure vessel is cooled, evacuated and sulfur tetrafluoride is added to the cooled chamber. The vessel is closed and the reaction is conducted under predetermined conditions.

The conditions under which the reaction is run to obtain maximum yield of product are determined to some extent by the chemical reactivity and by the thermal stability of the reactants and of the fluorine-containing products formed in the reaction.

The mole ratio of sulfur tetrafluoride to each chlorine or bromine which is to be replaced in the halogenated reactant is not critical but is preferably not less than about 0.10 to 1 (that is, 1 mole of sulfur tetrafluoride for each 10 gram atoms of chlorine or bromine to be replaced) or more than 10 to 1 (10 moles of sulfur tetrafluoride for each gram atom of chlorine or bromine to be replaced). It is not essential for operability of the process that theoretical molar ratios be used since any unreacted materials can be recovered and reused.

To avoid formation of undesirable by-products, the temperature of the reaction is kept as low as operability permits. Generally, the reactants are heated slowly while being agitated, the heating being conducted by a stepwise procedure wherein the reactants are maintained for short periods of time at progressively higher temperatures. This procedure permits smooth operation of the process and avoids sudden increases in pressure in the reaction vessel. However, this procedure is not essential for operability and the reactants can, if desired, be heated in one step to the reaction temperature.

The reaction temperature will vary with the reactivity of the halogenated component but will generally lie between about 25° C. and about 700° C. Excessively high temperatures are not needed and offer no advantages. The preferred temperature range, that is, the range in which most halogenated compounds react to give satisfactory yields of fluorinated products, lies between about 100° C. and 500° C.

The pressure employed in a batch process is generally autogenous. It will usually lie between about 5 and 150 atmospheres but pressures outside this range are operable. The reaction times is between about 2 and about 48 hours. During the reaction period, the contents of the reaction vessel are preferably mixed, for example, by mechanical stirring and shaking.

The fluorination can be carried out advantageously in the presence of a catalyst. Examples of suitable catalysts are arsenic trifluoride, boron trifluoride, hydrogen fluoride, phosphorus pentafluoride, titanium tetrafluoride, silicon tetrafluoride, and chlorides of sulfur. These compounds function solely as catalysts and when used, need be present in only minor amounts, for example from 1% to 10% by weight of the sulfur tetrafluoride. The use of a catalyst can improve yields of organic fluorine compounds and reduce the length of time and the temperature employed in the reaction. The preferred catalysts are arsenic trifluoride, boron trifluoride, hydrogen fluoride and sulfur dichloride. It is not essential, however, that a catalyst be used in the operation.

The process of the invention can also be conducted by a continuous flow method wherein the chlorine or bromine-bearing reactant, if volatile, and sulfur tetrafluoride are passed into a reaction tube which is heated to a temperature sufficient to effect reaction. Alternatively the reaction tube or vessel can be charged with the chlorine or bromine-bearing reactant and sulfur tetrafluoride brought into contact with it continuously at the desired temperature. Generally, higher temperatures are needed in a continuous flow process than in a batch process since the former method is normally conducted at atmospheric pressure.

The products of the reaction are collected and purified by conventional procedures. For example, if the products are gaseous halogenated hydrocarbons, they can be passed through a series of scrubbing towers which contain an aqueous alkaline solution to remove acidic and corrosive products and then through a tower which contains a drier. The purified volatile products can be collected in vessels which are cooled to a low temperature with, for example, liquid nitrogen or liquid helium. The products can then be fractionally distilled through a low temperature unit. Halogenated hydrocarbon products which are liquids or solids at atmospheric pressure can be purified by washing with aqueous alkaline solutions, drying, and distilling or crystallizing. Scrubbing or washing the crude reaction product with an aqueous alkaline solution is an optional step and is illustrative of a conventional method of purification.

Products of the reaction which are sensitive to water or alkaline solutions may be purified by simple distillation or crystallization procedures.

The following examples, in which quantities are expressed as parts by weight, illustrate the process of the invention. The pressure vessels which are used in these reactions are lined with "Hastelloy" C (a well-known alloy of nickel, molybdenum and iron).

Example I

A pressure vessel (capacity, 1000 parts of water) is flushed with nitrogen and charged with 154 parts of carbon tetrachloride. The vessel and contents are cooled in a solid carbon dioxide-acetone mixture and evacuated to about 5–10 mm. pressure. The vessel is then charged with 108 parts of sulfur tetrafluoride. The reactants in this example are present in substantially equimolar ratios. The vessel is closed and heated with agitation at 100° C. for 2 hours, 150° C. for 2 hours, and 225° C. for 4 hours.

After cooling to room temperature, that is, about 25° C., the volatile products are vented into an evacuated stainless steel cylinder which is cooled in liquid nitrogen. There is obtained 229 parts of volatile products which are distilled through a low temperature unit and separated into two fractions. The first fraction, boiling at −38° C. to −9.5° C. and weighing 113 parts, is shown by infrared spectroscopy to contain about 15 mole percent of dichlorodifluoromethane. The second fraction, boiling at −9.5° to 23° C. (mainly at 21° to 23° C.) and weighing 91 parts, is shown to be almost entirely trichlorofluoromethane with a trace of dichlorodifluoromethane. The results of these analyses show that there is 66% conversion of carbon tetrachloride to trichlorofluoromethane and a 17% conversion to dichlorodifluoromethane. There is left in the vessel about 19 parts of a reddish liquid which is a by-product of the reaction and is a sulfur chloride.

*Example II*

A pressure vessel (capacity, 500 parts of water) is charged as described in Example I with 36.5 parts of carbon tetrachloride and 27 parts of sulfur tetrafluoride. The reactants are present in about equimolar ratios. The charged vessel is heated at 100° C. for 1 hour, 175° C. for 1 hour, 250° C. for 1 hour, and 350° C. for 2 hours. There is obtained 39 parts of volatile products which are shown by infrared spectroscopic analysis to contain 30 mole percent of dichlorodifluoromethane and 15 mole percent of trichlorofluoromethane. These data indicate a 46.5% conversion of carbon tetrachloride to dichlorodifluoromethane and a 23.2% conversion to trichlorofluoromethane.

*Example III*

Using the procedure of Example II, a mixture of 50 parts of carbon tetrabromide and 15 parts of sulfur tetrafluoride is heated with mechanical agitation at 150° C. for 2 hours and 225° C. for 4 hours. The reactants are present in approximately equimolar ratios. There is obtained 48 parts of volatile products from which 10 parts of material, boiling at 26.5–46° C. (mainly at 26.5–32.5° C.) is separated by fractional distillation. This fraction is shown by infrared spectroscopic analysis to contain 65–70 mole percent of dibromodifluoromethane. These data show that 27% of the carbon tetrabromide has been converted to dibromodifluoromethane.

There is also obtained in the reaction products 24 parts of higher boiling liquids from which 6.5 parts of tribromofluoromethane (B.P. 103–108° C.) is obtained by fractional distillation. These data show that 16% of carbon tetrabromide has been converted to tribromofluoromethane.

*Example IV*

A mixture of 33 parts of carbon tetrabromide and 22 parts of sulfur tetrafluoride is heated with agitation at 150° C. for 1 hour, 250° C. for 1 hour, and 325° C. for 1 hour. The reactants are present in the approximate ratio of one mole of carbon tetrabromide to 2 moles of sulfur tetrafluoride. There is obtained 37 parts of volatile products which are condensed in an evacuated stainless steel cylinder cooled in liquid nitrogen. The volatile products are distilled through a low temperature still to give 15 parts of product boiling at −50° C. to −37° C. and 11 parts boiling at −37° C. to −28° C. The lower boiling fraction (−50° C. to −37° C.) is shown by infrared spectroscopy to contain 60–65 mole percent of bromotrifluoromethane and 5 mole percent of carbon tetrafluoride. The higher boiling fraction (−37° C. to −28° C.) contains, in addition to unreacted SF$_4$, 5–10 mole percent of bromotrifluoromethane. These data show that there is 86% conversion of carbon tetrabromide to bromotrifluoromethane and 6% conversion to carbon tetrafluoride. There remains in the pressure reaction vessel about 16 parts of a brown liquid which is considered to be a mixture of bromine and sulfur bromide.

*Example V*

A mixture of 47.4 parts of hexachloroethane and 40 parts of sulfur tetrafluoride is heated with agitation at 150° C. for 1 hour, 250° C. for 1 hour, and 350° C. for 2 hours. The molar ratio of hexachloroethane to sulfur tetrafluoride is about 1:2. There is obtained 31 parts of volatile products which boil at −45° C. to −28° C. Products boiling higher than −28° C. and the liquid residue in the reaction vessel are combined, washed with 10% aqueous sodium hydroxide and distilled at atmospheric pressure. There is obtained 24 parts of a liquid boiling at 93–95° C. which is shown by infrared spectroscopy to be principally 1,1,2,2-tetrachloro-1,2-difluoroethane. The data show that 62.5% of the hexachloroethane is converted to tetrachlorodifluoroethane.

*Example VI*

A mixture of 40 parts of 2,2,3,3-tetrachlorohexafluorobutane and 27 parts of sulfur tetrafluoride is heated at 150° C. for 1 hour, 250° C. for 1 hour, and 350° C. for 2 hours. The molar ratio of tetrachlorohexafluorobutane to sulfur tetrafluoride is about 1:2. There is obtained 22 parts of volatile products which boil at −30° to −20° C. which are not further identified. The liquid residue from the reaction is washed with 10% aqueous sodium hydroxide and distilled. There is obtained 25 parts of 2,2,3-trichloro-1,1,1,3,4,4,4-heptafluorobutane, a water-white liquid which boils at 97–98° C. There is thus obtained a 66% conversion of the tetrachlorohexafluorobutane to the above-identified trichloroheptafluorobutane.

Examples I through VI illustrate the application of the process of the invention to a completely halogenated saturated hydrocarbon. Examples of other operable compounds of this group are perchlorocyclohexane and 1,8-dibromoperchlorooctane.

*Example VII*

A mixture of 24 parts of ethyl chloride and 44 parts of sulfur tetrafluoride is heated for 5 hours at 200° C. The reactants are present in the ratio of about 1 mole of the chloride to 1.1 moles of the tetrafluoride. There is obtained 67.0 parts of volatile products which are purified by passing through 40% aqueous potassium hydroxide solution, a tower containing solid potassium hydroxide and a tower containing "Drierite" to yield 14.1 parts of a gaseous product. This product is shown by mass spectrometric analysis to contain about 1.5 mole percent of ethyl fluoride. The conversion of ethyl chloride to ethyl fluoride is about 0.6%.

Example VII illustrates the application of the process of the invention to partially halogenated saturated hydrocarbons. As a further illustration of this class of reactants, a mixture of fluorine-containing products is obtained when 23 parts of 1,4-dibromobutane and 50 parts of sulfur tetrafluoride is heated 2 hours at 130° C., 4 hours at 160° C. and 4 hours at 200° C. The mixture of fluorinated products boils at 71–104° C. Examples of other compounds which can be used in the process are isobutyl bromide and 2-ethylhexyl chloride.

*Example VIII*

A mixture of 20 parts of tetrachloroethylene, 27 parts of sulfur tetrafluoride, and 1 part of arsenic trifluoride is heated at 200° C. for 2 hours, 300° C. for 2 hours, and 400° C. for 6 hours. Arsenic trifluoride is used herein solely as a catalyst. The molar ratio of tetrachloroethylene to sulfur tetrafluoride is about 1:2. There is obtained 28 parts of volatile products which are purified as described in Example VII to yield 16.7 parts of gaseous material. The purified product is shown by mass spectrometric analysis to contain on a molar basis 40% of 1,2-dichlorotetrafluoroethane, 40% of perfluoroethyl chloride and 20% of other chlorofluoro compounds.

Example IX

A mixture of 19.6 parts of hexachlorobutadiene and 33 parts of sulfur tetrafluoride is heated at 200° C. for 2 hours, 300° C. for 2 hours, and 400° C. for 4 hours. There is obtained 21.1 parts of volatile products which are purified by scrubbing as described in Example VII to obtain 6.8 parts of a gas which is shown by mass spectrometric analysis to consist principally of chloropentafluoroethane. Other components, present in small amounts, are chlorofluoroethanes of lower fluorine content and chlorofluoropropanes.

Example X

A. A mixture of 35 parts of hexachlorocyclopentadiene, 55 parts of sulfur tetrafluoride and 4 parts of boron trifluoride is heated at 180° C. for 1 hour, 230° C. for 2 hours, 280° C. for 2 hours, and 330° C. for 5 hours. Boron trifluoride is used herein solely as a catalyst. The molar ratio of hexachlorocyclopentadiene to sulfur tetrafluoride is about 1:4. There is obtained 42.7 parts of an orange liquid which contains a small quantity of solid. The liquid is dissolved in pentane, shaken with sodium fluoride and filtered. After removal of the pentane by evaporation, the residue is distilled to yield 14.4 parts of chlorofluorocyclopentenes boiling at 146–147° C.; $n_D^{25}$, 1.4420–1.4425. Infrared spectroscopic analysis shows that the product has the cyclopentene structure. Analytical data are: C, 20.85; Cl, 58.69; F, 21.15.

There is also obtained in the distillation of the reaction product 4.5 parts of a liquid boiling at 77–78° C./23 mm.; $n_D^{25}$, 1.4760. This product is characterized more completely in part B which follows.

B. The above experiment is repeated, using a mixture of 20 parts of hexachlorocyclopentadiene, 48 parts of sulfur tetrafluoride and 1 part of boron trifluoride and heating as described in the preceding paragraph. Boron trifluoride is used herein solely as a catalyst. The molar ratio of hexachlorocyclopentadiene to sulfur tetrafluoride is about 1:5.5. There is obtained 0.78 part of liquid chlorofluorocyclopentenes which boil at 83–84° C./24 mm.; $n_D^{25}$, 1.4760–1.4780.

Analysis.—Calc'd. for $C_5Cl_5F_3$: C, 20.4; Cl, 60.2; F, 19.4. Found: C, 20.79; Cl, 60.49; F, 19.63.

C. The above experiment is repeated, using a mixture of 15 parts of hexachlorocyclopentadiene, 36 parts of sulfur tetrafluoride and 4 parts of hydrogen fluoride. Hydrogen fluoride is used herein solely as a catalyst. The molar ratio of hexachlorocyclopentadiene to sulfur tetrafluoride is about 1:6. The mixture is heated at 150° C. for 1 hour, 200° C. for 2 hours, 250° C. for 2 hours, 300° C. for 2 hours, and 400° C. for 3 hours. There is obtained 9 parts of a yellow-orange liquid which is dissolved in pentane and shaken with sodium fluoride to remove free hydrogen fluoride. After removal of the heptane, the product is distilled to give a mixture of chlorofluorocyclopentenes.

Examples VIII, IX and X illustrate the application of the process of the invention to completely halogenated unsaturated aliphatic and cycloaliphatic hydrocarbons.

Example XI

A. A mixture of 28.5 parts of hexachlorobenzene and 33 parts of sulfur tetrafluoride is heated at 200° C. for 2 hours, 300° C. for 2 hours, and 400° C. for 4 hours. The molar ratio of hexachlorobenzene to sulfur tetrafluoride is about 1:3. The reaction vessel is cooled to room temperature and volatile by-products are removed by venting. There remains 50 parts of a brown liquid which is poured with stirring into 300 parts of water to hydrolyze the by-product sulfur chlorides. The heterogeneous aqueous mixture is filtered, using a commercial filter-aid. The colorless layer of organic liquid (16.5 parts) which separates from the filtrate is removed, dried over anhydrous magnesium sulfate and distilled at atmospheric pressure. There is obtained 13.1 parts of liquid which boils at 100–150° C. A cut, boiling at 117–118° C., is removed during the distillation and is shown by analysis to be $C_6F_8Cl_2$.

Analysis.—Calc'd. for $C_6F_8Cl_2$: C, 24.4; F, 51.5; Cl, 24.0. Found: C, 24.1; F, 53.0; Cl, 23.4.

The infrared and nuclear magnetic resonance spectra of this product show that it is principally 1,2-dichlorooctafluorocyclohexene.

A second cut in the distillation, boiling at 139–141° C., yields a solid, M.P. 30–32° C., which has the composition $C_6F_9Cl_3$.

Analysis.—Calc'd. for $C_6F_9Cl_3$: C, 20.6; F, 48.9; Cl, 30.4. Found: C, 20.1; F, 47.7; Cl, 31.1.

B. A mixture of 85.5 parts of hexachlorobenzene, 108 parts of sulfur tetrafluoride and 4.5 parts of sulfur dichloride is heated at 200° C. for 1 hour, 300° C. for 1 hour, and 350° C. for 8 hours. Sulfur dichloride is used herein solely as a catalyst. The reactants are used in the ratio of 0.3 mole of hexachlorobenzene to 1 mole of sulfur tetrafluoride. There is obtained 144 parts of brown liquid. The run is repeated and the crude liquid reaction products from both runs are combined. The crude liquid is poured into 600 parts of ice with stirring and allowed to stand until hydrolysis of by-product sulfur chlorides is complete. The colorless organic layer, separated by filtration and dried as described in Part A above, weighs 143 parts and is distilled to yield 112 parts of liquid boiling at 120–160° C. and 21.7 parts boiling at 160–200° C. The product is a mixture of cyclic chlorofluorocarbons similar to the products described under Part A of this example.

Example XI illustrates the application of the process to a completely halogenated aromatic hydrocarbon.

Example XII

A mixture of 15.8 parts of trichloroethylene and 27 parts of sulfur tetrafluoride is heated at 200° C. for 1 hour, 300° C. for 1 hour, and 400° C. for 2 hours. The molar ratio of trichloroethylene to sulfur tetrafluoride is about 1:2. There is obtained 35.3 parts of volatile products which are passed through three scrubbers charged with 40% aqueous potassium hydroxide, a tower charged with potassium hydroxide pellets and a tower charged with a commercial drying agent ("Drierite"). The purified product weighs 11.8 parts and is shown by mass spectrometric analysis to contain substantial quantities of 1,2-dichlorotetrafluoroethane and chloropentafluoroethane.

Example XII illustrates the application of the process to a partially halogenated unsaturated hydrocarbon. As a further illustration of this class of reactants, allyl fluoride is obtained by heating allyl chloride (30 parts) with sulfur tetrafluoride (47 parts) at about 150° C. for 1 hour.

Example XIII

A mixture of 20 parts of 4,6-dichloropyrimidine and 60 parts of sulfur tetrafluoride is heated progressively at 50°, 100°, and 150° C. for 3 hours each in a stainless steel shaker tube. The product is taken up in ether and fractionated. A yellow liquid, boiling at 35–40° C./55 mm. is obtained (11.2 parts, 72% yield). Refractionation yields a main fraction at 50° C./100 mm. Mass spectral analysis shows that the product is chiefly the 4,6 - difluoropyrimidine, although a small quantity of chlorodifluoropyrimidine is also present.

Example XIV

A mixture of 46 parts of 2,4-dichloropyrimidine and 90 parts of sulfur tetrafluoride is treated in a manner similar to that described in Example XIII. A fraction is collected, boiling at 53° C./45 mm., which is shown by mass spectral analysis to be 2,4-difluoropyrimidine containing some chlorodifluoropyrimidine.

The product is fractionated precisely by vapor phase chromatography to give two pure fractions which are identified as (a) 2,4-difluoropyrimidine, $n_D^{25}$, 1.4278, and (b) 2,4-difluoro-6-chloropyrimidine, $n_D^{25}$, 1.4588.

(a) *Analysis.*—Calc'd. for $C_4H_2F_2N_2$: F, 32.73. Found: F, 32.30.

The nuclear magnetic resonance spectrum is in agreement with the 2,4-difluoropyrimidine structure.

(b) *Analysis.*—Calc'd. for $C_4HClF_2N_2$: F, 25.24. Found: F, 25.35.

The nuclear magnetic resonance spectrum is in agreement with the 2,4-difluoro-6-chloropyrimidine structure.

The dichloropyrimidines employed in the preceding examples contain some 2,4,6-trichloropyrimidine.

*Example XV*

2,4,6-trichloropyrimidine (40 parts) and sulfur tetrafluoride (100 parts) are heated in a stainless steel container at 175° C. for 4 hours and then at 225° C. for 3 hours. Fractionation at reduced pressure yields (after a volatile fraction boiling at 60–80° C.) a product boiling at 66–67° C./15 mm., $n_D^{25}$, 1.5180, which is a fluorodichloropyrimidine.

*Analysis.*—Calc'd. for $C_4HCl_2FN_2$: F, 11.38; Cl, 42.47. Found: F, 11.39; Cl, 42.69.

The nuclear magnetic resonance pattern indicates that the initial product before fractionation is composed of approximately equal amounts of 2-fluoro-4,6-dichloro- and 4-fluoro-2,6-dichloropyrimidines.

By using the process of Examples XIII, XIV and XV, 2-fluoropyrimidine is obtained from 2-chloropyrimidine. Similarly, 4- or 6-fluoropyrimidines are obtained by treatment of the corresponding 4- or 6-chloropyrimidines with sulfur tetrafluoride.

Mixed fluorochloropyrimidines are obtained when the replacement reaction of sulfur tetrafluoride is not carried to completion.

Bromine-substituted pyrimidines can be used in place of the chloropyrimidines of the examples to yield the corresponding fluoropyrimidines. Examples of compounds useful in the process of this invention include 2,4 - dichloro - 6 - methylpyrimidine, 2,4 - dichloro - 6-methoxypyrimidine, 2,4 - dichloro - 6 - naphthylpyrimidine, 4,6 - dibromo - 2 - cyclohexylpyrimidine, 2,4,5-tribromopyrimidine and 4,6-dichloro-2,5-dimethylpyrimidine. As a result of the reaction with sulfur tetrafluoride, normally at least one of the chlorines or bromines in the 2-, 4- or 6-positions is replaced by fluorine to give the corresponding fluoropyrimidines.

*Example XVI*

A. A mixture of 23.1 parts of cyanuric chloride and 81 parts of sulfur tetrafluoride is heated for 2 hours at 150° C., 4 hours at 200° C. and 6 hours at 250° C. The molar ratio of cyanuric chloride to sulfur tetrafluoride is about 1:6. There is obtained 24.5 parts of brown liquid product which is distilled at atmospheric pressure to yield 6.8 parts of cyanuric fluoride ($C_3N_3F_3$), boiling at 70–73° C. The yield is 40%.

*Analysis.*—Calc'd. for $C_3N_3F_3$: F, 42.2; mol. wt., 135. Found: F, 42.36, 42.73; mol. wt., 120, 128.

B. A mixture of 46.2 parts of cyanuric chloride and 108 parts of sulfur tetrafluoride is heated as described in Part A of this example. The molar ratio of cyanuric chloride to sulfur tetrafluoride is about 1:4. There is obtained 49.8 parts of liquid product which is distilled at atmospheric pressure to yield 14.9 parts of liquid boiling at 113–114° C. and 12.3 parts of liquid boiling at 149–155° C. The product boiling at 113–114° C. is cyanuric chlorodifluoride ($C_3N_3F_2Cl$) which is obtained in 39% yield; the product boiling at 149–155° C. is cyanuric dichlorofluoride ($C_3N_3FCl_2$) which is obtained in 29% yield.

*Analysis.*—Calc'd. for $C_3N_3F_2Cl$: F, 25.1; Cl, 23.5. Found: F, 24.64; Cl, 23.80.

*Analysis.*—Calc'd. for $C_3N_3FCl_2$: F, 11.30; Cl, 42.3. Found: F, 11.30; Cl, 41.95.

Cyanuric chlorodifluoride is also obtained when a mixture of cyanuric trichloride (23.1 parts) and sulfur tetrafluoride (63.5 parts) is heated for 2 hours at 100° C., 4 hours at 150° C., and 6 hours at 200° C.

Cyanuric tribromide and sulfur tetrafluoride yield cyanuric fluorides when heated as described in the preceding example.

The cyanuric fluorides obtained as described in Example XVI are of value as reactive intermediates for the preparation of cyanuric esters (Kwasnik, FIAT Review of German Science 1939–1946, Inorganic Chemistry, Part I, pp. 243–244).

Examples XIII through XVI illustrate the process of the invention as applied to compounds which are free of Zerewitinoff active hydrogen and which contain chlorine or bromine bonded to a carbon atom which, in turn, is bonded to a heterocyclic nitrogen atom. The nitrogen atom is usually not affected, either as to position or substituents, in the process. Other compounds of this type which can be used as reactants in the process are 2,5-dichloropyridine, 2-chloroquinoline, 1-bromoisoquinoline, and 3,6-dichloropyridazine.

The process of this invention can be conducted by employing precursors of sulfur tetrafluoride. By precursors we mean compounds which will combine under the conditions of the process of the invention to form sulfur tetrafluoride in situ. To illustrate, sulfur tetrafluoride is formed by reacting sodium fluoride, chlorine and sulfur at 200°–300° C. for 4–12 hours in a sealed vessel under autogenous pressure. When this combination of precursors for sulfur tetrafluoride is reacted with, for example, carbon tetrachloride under conditions illustrated in Example V, chlorofluoromethanes are obtained.

I claim:

1. A process for obtaining fluorinated organic compounds comprising reacting with sulfur tetrafluoride under substantially anhydrous conditions organic compounds free of Zerewitinoff active hydrogen and containing bonded to a carbon at least one halogen of the group consisting of chlorine and bromine, any acyclic multiple bonds being between carbon atoms.

2. The process of claim 1 carried out in the presence of a catalyst of the group consisting of arsenic trifluoride, boron trifluoride, hydrogen fluoride, phosphorus pentafluoride, titanium tetrafluoride, silicon tetrafluoride and sulfur chlorides.

3. A process for replacing with fluorine at least one halogen atom of atomic number 17–35 in halogenated hydrocarbons bearing such atoms which comprises reacting said compounds with sulfur tetrafluoride under substantially anhydrous conditions.

4. A process for obtaining fluorinated organic compounds which comprises reacting with sulfur tetrafluoride under substantially anhydrous conditions perhalocarbons of at most six carbon atoms and containing at least one halogen atom of atomic number 17–35.

5. The process for replacing with fluorine at least one halogen atom of atomic number 17–35 in cyclic azines bearing such halogens which comprises reacting the said azines free of Zerewitinoff active hydrogen with sulfur tetrafluoride under substantially anhydrous conditions.

6. The process of claim 5 wherein the cyclic azines are halogen-bearing pyrimidines.

7. The process of claim 5 wherein the cyclic azines are cyanuric halides.

8. A process for obtaining fluorinated organic compounds comprising reacting with sulfur tetrafluoride at a temperature within the range of 25°–700° C. under substantially anhydrous conditions, organic compounds free of Zerewitinoff active hydrogen and containing bonded to a carbon at least one halogen of the group consisting of chlorine and bromine, any acyclic multiple bonds being between carbon atoms.

9. A process for obtaining fluorinated organic compounds comprising reacting with sulfur tetrafluoride at a temperature between about 25° and 700° C. and under substantially anhydrous conditions, organic compounds free of Zerewitinoff active hydrogen and containing bonded to a carbon at least one halogen of the group consisting of chlorine and bromine, any acyclic multiple bonds being between carbon atoms, the mole ratio of sulfur tetrafluoride to said organic compound being at least about 0.10.

10. A process for replacing with fluorine at least one halogen atom of atomic number 17–35 in halogenated hydrocarbons bearing such atoms which comprises reacting said compounds at a temperature within the range of 25°–700° C. with sulfur tetrafluoride under substantially anhydrous conditions.

11. The process of claim 10 wherein the mole ratio of sulfur tetrafluoride to each halogen atom which is to be replaced in the halogenated reactant is at least about 0.10.

12. The process of claim 4 wherein the perhalocarbon is carbon tetrachloride.

13. The process of claim 4 wherein the perhalocarbon is carbon tetrabromide.

14. The process of claim 4 wherein the perhalocarbon is 2,2,3,3-tetrachlorohexafluorobutane.

15. The process of claim 4 wherein the perhalocarbon is hexachlorobutadiene.

16. The process of claim 4 wherein the perhalocarbon is hexachlorobenzene.

17. The process of claim 3 wherein the halogenated hydrocarbon is ethyl chloride.

18. The process of claim 3 wherein the halogenated hydrocarbon is trichloroethylene.

19. The process of claim 5 wherein the cyclic azine is 4,6-dichloropyrimidine.

20. The process of claim 5 wherein the cyclic azine is 2,4-dichloropyrimidine.

References Cited in the file of this patent

UNITED STATES PATENTS

| | | |
|---|---|---|
| 2,549,988 | Perkins | Apr. 24, 1951 |
| 2,709,186 | Farlow et al. | May 24, 1955 |
| 2,759,026 | McCleary | Aug. 14, 1956 |
| 2,845,421 | Grundmann et al. | June 29, 1958 |

FOREIGN PATENTS

| | | |
|---|---|---|
| 3,141/31 | Australia | Jan. 20, 1933 |

UNITED STATES PATENT OFFICE
CERTIFICATE OF CORRECTION

Patent No. 2,937,171                    May 17, 1960

William Channing Smith

It is hereby certified that error appears in the printed specification of the above numbered patent requiring correction and that the said Letters Patent should read as corrected below.

Column 2, line 63, for "hydrocarboxyloxy" read -- hydrocarbyloxy --; column 10, line 61, strike out "free of Zerewitinoff active hydrogen" and insert the same after "azines" in line 59, same column 10.

Signed and sealed this 13th day of December 1960.

(SEAL)

Attest:
KARL H. AXLINE
Attesting Officer

ROBERT C. WATSON
Commissioner of Patents